United States Patent
Wang et al.

(10) Patent No.: US 12,368,600 B2
(45) Date of Patent: Jul. 22, 2025

(54) PROTECTING THE INTEGRITY OF COMMUNICATIONS FROM CLIENT DEVICES

(71) Applicant: Google LLC, Mountain View, CA (US)

(72) Inventors: Gang Wang, Jersey City, NJ (US); Borbála Katalin Benko, Rüschlikon (CH)

(73) Assignee: Google LLC, Mountain View, CA (US)

( * ) Notice: Subject to any disclaimer, the term of this patent is extended or adjusted under 35 U.S.C. 154(b) by 287 days.

(21) Appl. No.: 17/634,100

(22) PCT Filed: May 1, 2020

(86) PCT No.: PCT/US2020/031109
§ 371 (c)(1),
(2) Date: Feb. 9, 2022

(87) PCT Pub. No.: WO2021/029924
PCT Pub. Date: Feb. 18, 2021

(65) Prior Publication Data
US 2022/0321356 A1    Oct. 6, 2022

Related U.S. Application Data

(60) Provisional application No. 62/886,194, filed on Aug. 13, 2019.

(51) Int. Cl.
 H04L 29/06  (2006.01)
 H04L 9/30   (2006.01)
 H04L 9/32   (2006.01)
(52) U.S. Cl.
 CPC ............. H04L 9/3247 (2013.01); H04L 9/30 (2013.01); H04L 9/3213 (2013.01)

(58) Field of Classification Search
 CPC ....... H04L 9/3247; H04L 9/30; H04L 9/3213; H04L 63/0807; H04L 63/123;
(Continued)

(56) References Cited

U.S. PATENT DOCUMENTS 9,838,203 B1   12/2017   Kisley et al.
9,858,781 B1    1/2018   Campero et al.
(Continued)

FOREIGN PATENT DOCUMENTS

CN   102713922   10/2012
CN   109150910    1/2019
(Continued)

OTHER PUBLICATIONS

Office Action in European Appln. No. 20727103.2, dated Jul. 25, 2023, 6 pages.
(Continued)

Primary Examiner — Joseph P Hirl
Assistant Examiner — Leynna Truvan
(74) Attorney, Agent, or Firm — Fish & Richardson P.C.

(57) ABSTRACT

Methods, systems, and apparatus, including an apparatus for verifying the integrity of requests and the devices that sent the requests. In some aspects, a method includes receiving, from a client device, a request including an attestation token generated by the client device. The attestation token includes a set of data that includes at least a public key of the client device, a token creation, and a device integrity token that includes a verdict. The attestation token also includes a digital signature of the set of data generated using a private key corresponding to the public key. The integrity of the
(Continued)

request is verified using the attestation token by determining that the token creation time being within a threshold duration of the time at which the request was received, the set of data was not modified since the attestation token was created, and the verdict indicates the client device is trustworthy.

19 Claims, 3 Drawing Sheets

(58) Field of Classification Search
CPC . H04L 63/0442; H04L 9/3228; H04L 9/3234; H04L 9/0825; H04L 12/417; H04L 2012/6451; H04L 29/06714; H04L 63/061; H04L 9/006; H04L 9/3006; H04L 9/32; H04L 12/1439; H04L 47/527; H04L 63/12; H04L 41/5041; H04L 41/0622; H04L 41/064; H04W 12/04071; H04W 12/0471; H04W 12/10; H04W 12/106; G06F 2221/0711; G06F 2211/00; G06F 2211/008; G06F 16/2365; G06F 21/64; G05B 2219/25423; G05B 23/0221; G05B 2219/14042; G05B 2219/14074; G05B 2219/24042; G05B 2219/25235; H01H 2239/002; H04H 60/23; G11B 20/00811; G01N 29/341; G07B 2017/00758; G07B 2017/00846; G07B 2017/00895; G07B 2017/00766

See application file for complete search history.

(56) References Cited

U.S. PATENT DOCUMENTS

| | | | | |
|---|---|---|---|---|
| 11,334,882 | B1* | 5/2022 | Jameson | H04L 9/3231 |
| 2008/0307223 | A1 | 12/2008 | Brickell et al. | |
| 2014/0279556 | A1* | 9/2014 | Priebatsch | G06Q 20/385 705/67 |
| 2018/0212770 | A1 | 7/2018 | Costa | |
| 2019/0068636 | A1 | 2/2019 | Wang | |
| 2019/0074979 | A1 | 3/2019 | Xu et al. | |
| 2019/0124070 | A1 | 4/2019 | Engan et al. | |
| 2019/0312733 | A1* | 10/2019 | Engan | H04L 9/3247 |

FOREIGN PATENT DOCUMENTS

| | | |
|---|---|---|
| JP | 2019-515368 | 6/2019 |
| WO | WO 2017042400 | 3/2017 |
| WO | WO 2019050527 | 3/2019 |

OTHER PUBLICATIONS

Anonymous, [online], "Get Started with JSON Web Tokens—Auth0," retrieved from URL:https://web.archive.org/web/20190523072227/https://auto0.com/learn/json-web-tokens/, May 23, 2019, 10 pages.

Anonymous, [online] "JSONWeb Token (JWT)," retrieved from URL://https://web.archive.org/web/20190807042738/https://www.iana.org/assignments/jwt/jwt.xhtml, retrieved on Aug. 7, 2019, 8 pages.

International Preliminary Report on Patentability in International Appln. No. PCT/US2020/031109, Feb. 24, 2022, 8 pages.

International Search Report and Written Opinion in International Appln. No. PCT/US2020/031109, Aug. 10, 2020, 15 pages.

Notice of Allowance in Korean Appln. No. 10-2022-7003521, mailed on Sep. 27, 2023, 3 pages (with English translation).

Office Action in Chinese Appln. No. 202080052625.6, mailed on Sep. 15, 2023, 19 pages (with English translation).

Notice of Allowance in Japanese Appln. No. 2022-506215, dated Apr. 24, 2023, 5 pages (with English translation).

Office Action in Korean Appln. No. 10-2022-7003521, dated Mar. 1, 2023, 5 pages (with English translation).

Office Action in Indian Appln. No. 202127062208, dated Jun. 15, 2022, 7 pages (with English translation).

Hearing Notice in Indian Appln. No. 202127062208, mailed on Mar. 16, 2024, 2 pages (with English translation).

Kaur et al., "Enhanced cloud computing security and integrity verification via novel encrpytion techniques" International Journal of Emerging Technology in Computer Science & Electronics, vol. 15, Issue 1, May 2015, 125-131.

Notice of Allowance in Chinese Appln. No. 202080052625.6, mailed on Feb. 2, 2024, 5 pages (with English translation).

Shen Haibo and others, "Based on Oauth 2.0 Extended Client Certifier and the United Nations" Computer engineering and equipment, Feb. 16, 2017, page # unknown.

Developer.android.com [online], "About the SafetyNet Attestation API deprecation" Oct. 2023, retrieved on Apr. 29, 2025, retrieved from URL <https://developer.android.com/privacy-and-security/safetynet/deprecation-timeline>, 4 pages.

Wikipedia.org [online], "Elliptic Curve Digital Signature Algorithm" created on Feb. 2004, retrieved on Apr. 29, 2025, retrieved from URL <https://en.wikipedia.org/wiki/Elliptic_Curve_Digital_Signature_Algorithm>, 8 pages.

\* cited by examiner

PROTECTING THE INTEGRITY OF COMMUNICATIONS FROM CLIENT DEVICES

CROSS-REFERENCE TO RELATED APPLICATIONS

This application is a National Stage Application under 35 U.S.C. § 371 and claims the benefit of International Application No. PCT/US2020/031109, filed May 1, 2020, which claims priority to U.S. Provisional Application No. 62/886,194, filed Aug. 13, 2019, entitled PROTECTING THE INTEGRITY OF COMMUNICATIONS FROM CLIENT DEVICES. The disclosures of the foregoing applications are incorporated herein by reference in their entirety.

BACKGROUND

Client devices transmit requests and other data over public networks, such as the Internet. These communications can be altered by other parties, such as parties that intercept the communications and/or intermediaries that receive the communications and forward them to other parties.

Client devices are also subject to malicious attacks, such as viruses and malware that can send fraudulent requests without the user's knowledge or authorization. In addition, other parties can emulate a client device to send requests that appear to originate from the client device, but actually come from a device of the other parties.

SUMMARY

This specification describes technologies relating to authentication techniques for protecting the integrity of communications transmitted by client devices.

In general, one innovative aspect of the subject matter described in this specification can be embodied in methods that include receiving, from a client device, a request including an attestation token generated by the client device, the attestation token including: a set of data that includes at least (i) a public key of the client device, (ii) a token creation time that indicates a time at which the attestation token was created, and (iii) a device integrity token that includes a verdict that indicates a level of trustworthiness of the client device; and a digital signature of the set of data, wherein the digital signature was generated using a private key that corresponds to the public key; verifying an integrity of the request using the attestation token, including: determining whether the token creation time is within a threshold duration of a time at which the request was received; determining, using the public key and the digital signature of the set of data generated using the private key, whether the set of data was modified after the attestation token was created; determining whether the verdict of the device integrity token indicates that the client device is a trustworthy client device; and determining that the integrity of the request is valid based at least on determination that the token creation time is within the threshold duration of the time at which the request was received, a determination that the set of data has not been modified since the attestation token was created, and a determination that the verdict indicates that the client device is a trustworthy client device; and if the determination is that the request is valid, responding to the request in response to determining that the integrity of the request is valid. Other implementations of this aspect include corresponding apparatus, systems, and computer programs, configured to perform the aspects of the methods, encoded on computer storage devices.

These and other implementations can each optionally include one or more of the following features. In some aspects, the set of data further comprises a payload that includes data specific to the request. The request can be a request to delete user data and the payload can include data specifying an operation to delete the user data.

Some aspects can include, if the determination is not that the request is valid, ignoring the request. In some aspects, the device integrity token is generated by a device integrity system different from the client device and based on signals received from the client device.

In some aspects, the device integrity token includes a digital signature of a second set of data included in the device integrity token, the digital signature of the second set of data is generated using a second private key of the device integrity system, and determining that the integrity of the request is valid includes determining that the second set of data was not changed since the device integrity token was generated using a second public key that corresponds to the second private key to verify the digital signature of the second set of data.

In some aspects, the second set of data includes the public key generated by the client device and determining that the integrity of the request is valid includes determining that the public key in the set of data of the attestation token matches the public key in the second set of data of the device integrity token.

In some aspects, the second set of data can include a second token creation time that indicates a time at which the device integrity token was create and determining that the integrity of the request is valid further comprises determining that the second token creation time is within a second threshold duration of a time at which the request was received.

The subject matter described in this specification can be implemented in particular embodiments so as to realize one or more of the following advantages.

Using attestation tokens to transmit data from client devices provides a secure communication channel between the client device and the computers or other devices of other entities. Including, with the attestation token, a digital signature of the data included in the attestation token enables the entities to verify that the data in the attestation token was not changed after the attestation token was created. In addition, the inclusion of a token creation time in the attestation token enables recipients to determine whether requests are new or potentially part of a replay attack. These effects serve to increase the trustworthiness of communications such as requests that are received from a client device. This increases the reliability with which a decision to respond to a request can be taken. These effects serve to increase the trustworthiness of a communication channel between the client device and the computers or other devices of other entities.

The attestation token can also include a device integrity token that indicates the integrity of the client device that transmitted the attestation token, which enables the recipient(s) of the attestation token to verify that the data came from a trusted client device, e.g., rather than from an emulator or a compromised device. The device integrity token can be generated and digitally signed by a third-party device analyzer so that recipients of the attestation token can verify that the client device was evaluated by the third-party device analyzer and that the data in the device integrity token was not modified after creation by the third-party device analyzer. These effects serve to increase the trustworthiness of data received from a client device. This increases the reliability with which a decision to respond to a request can be taken.

The device integrity token can also include the public key, or the cryptohash of the public key (which might be smaller in size), of the client device that is used to digitally sign the attestation token. This bounds the device integrity token to the attestation token. This can also be used to verify that the device integrity token belongs to that client device and represents the integrity of that client device. Including a token creation time that indicates when the device integrity token was created enables recipients to determine when the client device was evaluated, which can be used by the recipient to determine a level of trust for the client device. Client devices can be periodically evaluated and new device integrity tokens can be issued based on each evaluation so that the device integrity token for a client device represent the current integrity of the client device which can change over time, e.g., in response to new attacks. These effects serve to increase the trustworthiness of a particular client device. This increases the trustworthiness of data received from the particular client device. This increases the reliability with which a decision to respond to a request can be taken.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, systems and techniques described herein can provide a secure communication channel between client devices and other entities, such as content publishers, digital component distribution systems, and digital component providers that create and provide digital components for distribution by the digital component distribution system. The client devices can provide, with requests and other data transmissions over a network, an attestation token that is used by the other entities to validate the integrity of the requests and the integrity of the client device. The requests can include, for example, requests to manage data of the users (e.g., to delete user-related data), requests for content, and/or requests for digital components to present with other content. Securing the communication channel using the attestation token ensures that fraudulent users cannot change, delete, or otherwise access user data, or change the content of the requests, e.g., to deceive digital component distribution systems, providers, and/or other entities. The attestation tokens attest to the validity of the transmissions.

The attestation token can be digitally signed using a private key of the client device. Digitally signing the set of data comprised in the attestation token results in a digital signature of the set of data that is also comprised within the attestation token. The client device can confidentially maintain the private key. The attestation token can include, among other things, a public key that corresponds to the private key, a payload, and a device integrity token. The device integrity token can include a verdict that indicates a level of integrity of the client device, as determined by a third-party device integrity system. The device integrity token can be digitally signed by the third-party device integrity system using a private key that the third-party device integrity system keeps confidential. A public key that corresponds to this private key can be provided to the recipients so that they can trust that the client device was evaluated by the device integrity system. This combination of using two pairs of keys provides a secure communication channel, e.g., by binding the two keys, that enables recipients to validate the integrity of client devices and the integrity of communications received from the client devices.

Figure 1:
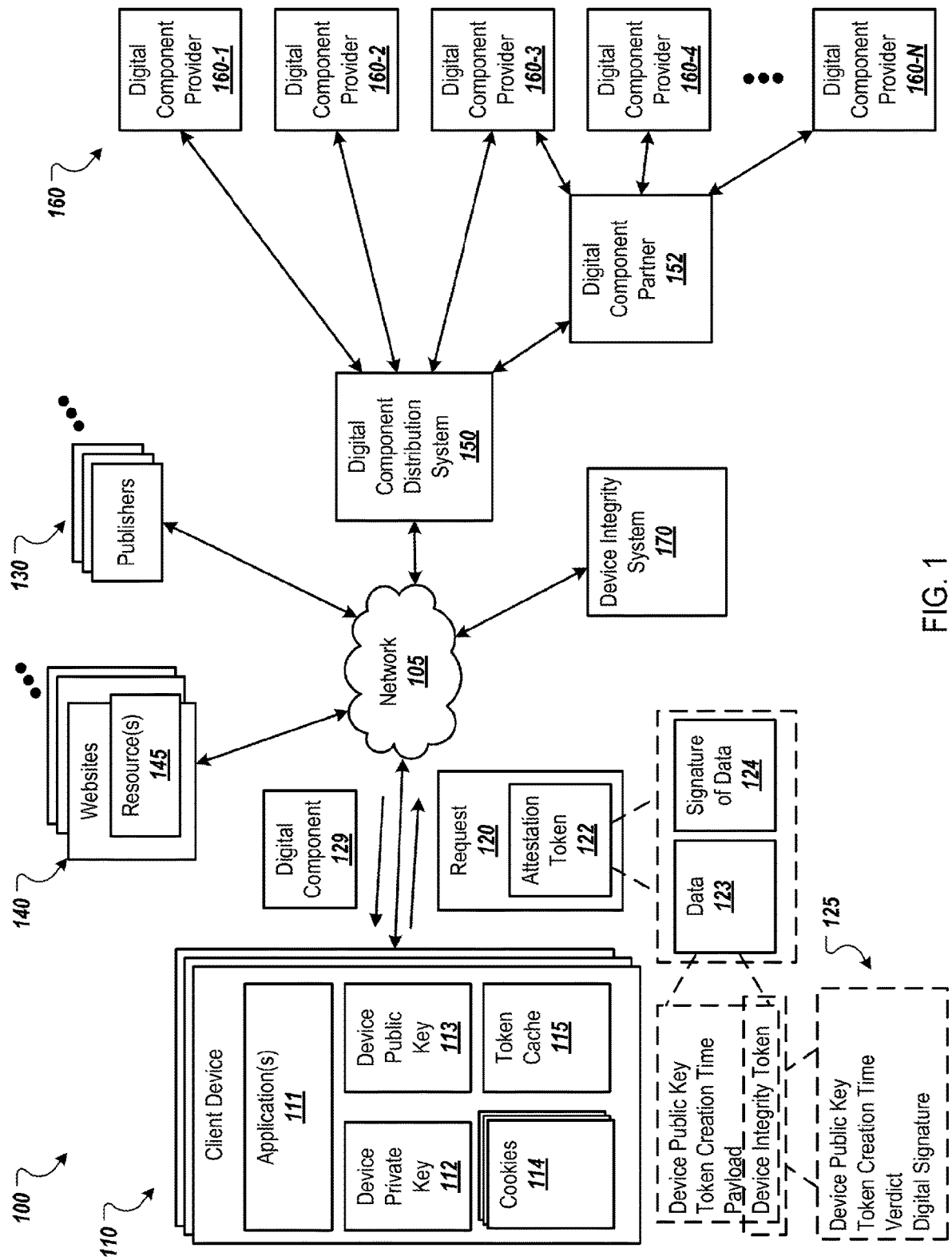
FIG. 1 is a block diagram of an environment in which a digital component system distributes digital components.

FIG. 1 is a block diagram of an environment 100 in which a digital component system 150 distributes digital components 129. The example environment 100 includes a data communication network 105, such as a local area network (LAN), a wide area network (WAN), the Internet, a mobile network, or a combination thereof. The network 105 connects client devices 110, publishers 130, websites 140, a digital component distribution system 150, and a device integrity system 170. The example environment 100 may include many different client devices 110, publishers 130, and websites 140.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, digital media players, smart speakers, wearable devices (e.g. smart watches), and other devices that can send and receive data over the network 105. A client device 110 typically includes applications 111, such as a web browser and/or native applications to facilitate the sending and receiving of data over the network 105. A native application is an application developed for a particular platform or a particular device. Publishers 130 can develop and provide the native applications to the client devices 110.

Some resources 145, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component 129 can electronically be stored in a physical memory device as a single file or in a collection of files, and digital components can take the form of video files, audio files, multimedia files, image files, or text files and include advertising information, such that an advertisement is a type of digital component. For example, the digital component 129 may be content that is intended to supplement content of a web page, resource, or application page presented by an application 111. More specifically, the digital component 129 may include digital content that is relevant to the resource content (e.g., the digital component may relate to the same topic as the web page content, or to a related topic). The provision of digital components by the digital component distribution system 150 can thus supplement, and generally enhance, the web page content.

When the application 111 loads a resource 145 or application content that includes one or more digital component slots, the web browser 111 can request a digital component 129 for each slot from the digital component distribution system 150. The digital component distribution system 150 can, in turn request digital components from digital component providers 160. The digital component providers 160 are entities that provide digital components for presentation with resources 145 and/or other content. An example digital component provider is an advertiser that provides an advertisement.

In some cases, the digital component distribution system 150 can also request digital components from one or more digital component partners 152. A digital component partner 152 is an entity that selects digital components on behalf of digital component providers 160 in response to digital component requests.

The digital component distribution system 150 can select a digital component for each digital component slot based on various criteria. For example, the digital component distribution system 150 can select, from the digital components received from the digital component providers 160 and/or the digital component partners 152, a digital component based on relatedness to the resource 145 or other application content, performance of the digital component (e.g., a rate at which users interact with the digital component), etc. The digital component distribution system 150 can then provide the selected digital component(s) to the client device 110 for presentation with the resource 145 or other application content. The digital component distribution system 150 can transmit selected digital components 129 to one or more client devices 110 for presentation by applications 111 operating on the client devices 110.

When the application 111 sends a request 120 over the network 105, the application 111 can send an attestation token 122 with the request. For example, if the application 111 sends a digital component request to the digital component distribution system 150, this request can include an attestation token 122. Similarly, if the application 111 sends a request or other data to another entity (e.g., to a publisher 130, the digital component distribution system 150, the digital component partner 152, or a digital component provider 160) to manage, e.g., delete, the data stored by that entity, this request can include an attestation token 122.

In some implementations, the application 111 is configured to send attestation tokens 122 for specified types of requests. For example, each application 111 that sends attestation tokens 122 can include a software development kit (SDK) or application programming interface (API) that causes the application 111 to generate and/or send the attestation tokens 111. The SDK can specify a set of requests, e.g., requests for managing user data, requesting digital components, etc., for which attestation tokens 122 are to be included. Other types of requests, e.g., requesting a news web page, may not require an attestation token 122.

In some implementations, the application 111 is configured to generate the attestation token 122 for each specified type of request. In some implementations, the application 111 is configured to request, from the operating system of the client device 110 or another application operating on the client device 111, an attestation token 122 to send with a request 120. For example, trusted code of the operating system in the browser binary of a web browser can generate the attestation token 122. In this example, the application 111 can send, to the other application, a set of data 123 for inclusion in the attestation token 122.

The attestation token 122 is used by entities to validate the integrity of the request and the integrity of the client device 110. For example, enabling users to manage their data that is stored by other entities can open up the possibility of malicious users attempting to manage and/or steal other users' data. For digital components, some malicious entities may attempt to falsify the parameters of digital component requests, e.g., to specify different resources with which the digital component will be provided and/or to specify a different user to which the digital component will be presented to make the request appear more valuable than it actually is. In addition, some malicious parties may attempt to emulate others' client devices for nefarious purposes.

The attestation token 122 provides a secure communication channel between the client device 110 and the computers or other devices of other entities through intermediaries that prevents others from altering the requests 120 and ensures that the request 120 came from a validated client device 110. The attestation token 122 includes the set of data 123 and a signature 124, e.g., a digital signature, generated based on the set of data 123. The set of data 123 can include a public key of the client device 110 sending the request (e.g., public key 123), a token creation time that indicates a time at which the attestation token 122 was created, a payload, and/or a device integrity token 125.

The client device 110 generates and maintains one or more pairs of related cryptographic keys including a private key 112 and a public key 113 that corresponds to, and is mathematically linked to, the private key 112. Data that is digitally signed using the private key 112 can only be verified using the corresponding public key 113. An attestation token 122 that includes a digital signature 124 generated using a private key 112 that corresponds to a public key 113 can only be verified using the corresponding public key 113. Similarly, data that is encrypted using the public key 113 can only be decrypted using the corresponding private key 112.

The application 111 initiating a request (or another application operating on the client device 110) generates a signature 124 of the set of data 123 using the private key 112. In some implementations, the application 111 uses an Elliptic Curve Digital Signature Algorithm (ECDSA) to generate the digital signature, but other signature techniques can also be used, such as RSA. As the attestation token 122 can be sent from a mobile device, signature techniques that result in smaller data sizes may be preferable. The public key 113 is provided with the attestation token 122 so that entities that receive the attestation token 122 can use the public key 113 to verify the signature 124 of the set of data 123.

The private key 112 and the public key 113 of the client device 110 can be replaced. For example, the keys 112 and 113 can be replaced periodically based on a specified time period to prevent entities from tracking users using the public key 113 included in the attestation token 122. In another example, the user can initiate the key replacement and, in response, a new pair of private and public keys can be generated by the client device 110.

The public key 113 for a client device 110 can serve as a unique device identifier for the client device 110. As described in more detail below, the public key 113 in this role can enable recipients of the request 120 to verify that the request 120 originated from the client device 110.

As described above, the token creation time indicates a time at which the attestation token 122 was created. The application 111 can record the creation time when the application creates the attestation token. This token creation time can be a high resolution timestamp (e.g., accurate to the second, to the millisecond, or to the microsecond). The token creation time can be used to determine whether a request 120 that includes the attestation token 122 is new or recent request. For example, the entity that receives the attestation token 122 can compare the token creation time to a current time or a time at which the attestation token 122 was received. If the difference between the two times exceeds a threshold, the entity can determine that the request is not new, or invalid, as described in more detail below.

The token creation time can also be used to detect replay attacks. For example, if multiple requests having the same set of data 123, including the same token creation time, are received, the entity that receives the requests can determine that the requests are duplicates and/or that the requests are part of a replay attack.

The token creation time, in combination with other data, can also serve as a transaction identifier for a request 120. For example, the transaction identifier can be a combination of two or more of the token creation time of the attestation token 122 and the public key 113 of the attestation token 122. The transaction identifier can be used to deduplicate multiple versions of the same request received from multiple channels. For example, the digital component provider 160-3 can receive the same request from both the digital component distribution system 150 and the digital component partner 152. In this example, the transaction identifier can be based on the token creation time of the attestation token 122 and the public key 113 of the attestation token 122. The digital component provider 160-3 can compare the two pieces of data in two or more requests to determine whether the requests are duplicates.

The payload can include data for the individual request 120. For example, if the request 120 is for a digital component, the payload can include data that can be used to select a digital component. This payload could include the resource 145 that has the digital component slot (or a URL for the resource 145), information about the resource 145 (e.g., topic of the resource), information about the digital component slot (e.g., the number of slots, the type of slots, the size of the slots, etc.), information about the client device 110 (e.g., type of device, IP address of the device, geographic location of the client device 110) if the user has enabled this feature, and/or other appropriate information.

If the request 120 is to manage the user's data at a publisher 130, the digital component distribution system 150, the digital component partner 152, a digital component provider 160, or another entity, the request 120 can include data specifying the requested change. For example, if the user selected to remove all of the user's data from a digital component provider 160-2, the payload would include data specifying this removal of data and the digital component provider 160-2 (e.g., an identifier or network address for the digital component provider 160-2).

The device integrity token 125 enhances the fraud detection capabilities of the attestation token 122 by enabling recipient's to determine whether the request 120 was sent by a trusted client device 110. The client device 110 can request a device integrity token 125 from a device integrity system 170. For example, the client device 110 can include a device integrity application that obtains fraud detection signals, e.g., device-level fraud signals related to the client device 110, and sends those signals to the device integrity system 170. The device integrity system 170 can evaluate the fraud detection signals and determine whether the client device 110 is trustworthy. In some implementations, the device integrity system 170 can assign, to the client device 110, a verdict that represents a level of trustworthiness based on the evaluation. For example, the levels of trustworthiness can include first value indicative of a fully trusted device, a second value indicative of a trusted device that is not fully trusted, a third value indicative of a suspect device, and a fourth value indicative of a non-trusted device. The device integrity system 170 can then send a device integrity token 125 that includes the verdict to the client device 110.

The client device 110 can request a device integrity token 125 for each request 120 being sent from the client device 110 that includes an attestation token 122. However, as there could be thousands of client devices 110 generating millions of requests daily, this could overburden the device integrity system 170. In some implementations, each client device 110 can request a device integrity token 125 for the client device 110 periodically based on a specified time period, e.g., hourly, daily, weekly, etc. The client device 110 can then store the device integrity token 125 in a token cache 115. The application that generates the attestation token 122 for a request 120 can then access the device integrity token 125 from the token cache 115.

By periodically updating and replacing the device integrity token 125 for a client device 110, the device integrity token 125 represents the current (based on the specified time period) integrity of the client device 110. For example, the integrity of the client device 110 can change over time, e.g., in response to downloading a virus. Thus, more frequent updates to the device integrity tokens can better represent the integrity of client devices, but at the expense of sending more requests to the device integrity system 170 (e.g., using more bandwidth) and processing more requests by the device integrity system 170 (e.g., requiring more processing power).

The device integrity token 125 can include the public key 113 of the client device 110 (or cryptohash of the public key 113 of the client device 110 or another identifier for the client device 110), a token creation time that indicates the time at which the device integrity token 125 was created, the verdict, and a signature, e.g., a digital signature. The inclusion of the public key 113 in the device integrity token 125 binds the device integrity token 125 to the attestation token 122 as both tokens include the public key 113. By including the public key 113 of the client device 110 in the device integrity token 125, a recipient of the attestation token 122 can determine that the device integrity token 125 was generated for that client device 110. This prevents other parties from being able to include a device integrity token 125 for a trusted device in requests from an emulator or compromised client device.

This token creation time enables recipients of a request 120 that includes the device integrity token 125 to determine when the client device 110 was last evaluated. In turn, this can be used to determine whether to trust the client device 110. For example, if the device integrity token 125 was created weeks before the request 120 was generated and received, a recipient may be hesitant to trust the client device 110 as the integrity of the client device 110 may have changed during those weeks.

As described above, the verdict indicates the level of trustworthiness (or integrity) of the client device 110 at the time that the device integrity token 125 was generated. The recipients use the verdict to determine whether to trust a request 120 that includes the device integrity token 125. For example, if the verdict indicates that the client device 110 is not trustworthy, the recipient can ignore the request, e.g., not respond to the request.

The device integrity system 170 can use a private key and the data in the device integrity token 125 to generate a digital signature that is included with the device integrity token 125. The device integrity system 170 can keep this private key confidential and distribute a public key that corresponds to the private key to potential recipients of requests sent by client devices 110, such as the publishers 130, the digital component distribution system 150, the digital component partner 152, and the digital component providers 160. This enables the recipients to verify the digital signatures of the device integrity token 125. This also allows the recipients to know that the client devices 110 were evaluated by the device integrity system 170 and thus, the verdict can be trusted.

The client device 110 can send requests 120 that include an attestation token 122 that, in turn, includes a device integrity token 125. As the client devices 110 can be mobile devices that communicate wirelessly, the size of the attestation token 122 should be small, of possible, to reduce the amount of bandwidth required to transmit the attestation token 122. Several techniques can be used to reduce the size of the attestation token 122. In the illustrated example, both the attestation token 122 and the device integrity token 125 include the public key 113 of the client device 110.

In some implementations, the application that generates the attestation token 122 can remove one of the public keys after the digital signatures have been generated but before transmitting the attestation token 122. For example, the application can remove the public key 113 from the attestation token 122 but leave the public key 113 in the device integrity token 125. In this example, the recipient of the attestation token 122 can obtain the public key 113 from the device integrity token 125 for use in verifying the digital signature of the attestation token 122.

Similarly, the application can remove the public key 113 from the device integrity token 125, but leave the public key in the attestation token 122. In this example, the recipient of the attestation token 122 can obtain the public key from the attestation token 122 for use in verifying the digital signature of the device integrity token 125. For example, the device of the recipient can be configured to check both tokens for the public key 113. If only one of the tokens includes the public key 113, the device can obtain the public key 113 from the token that includes the public key 113 for using verifying the digital signature of the token that does not include the public key 113. For example, the device can copy the public key 113 to the place in the token where the public key 113 is normally located and then verify the digital signature using the data of the token.

In some applications, the client device 110 can populate the attestation token 122 with the device integrity token 125 and all other data discussed in this application, except the public key 113 of the device, then digitally sign the attestation token (again without the device public key in the attestation token 122 but with the device public key in the device integrity token 125). The recipient will validate the attestation token 122 and the embedded device integrity token 125 as discussed herein, except using the device public key 113 included in the device integrity token 125 for the digital signature validation. In some more applications, the device integrity token 125 may contain the cryptohash of the device public key 113 and the attestation token 122 may contain the device public key 113, if the cryptohash of the device public key 113 is smaller than its cryptohash. Note that this can reduce the attestation token 122 size during transmission, without reducing the crypto power to detect fraud or falsified requests.

Figure 2:
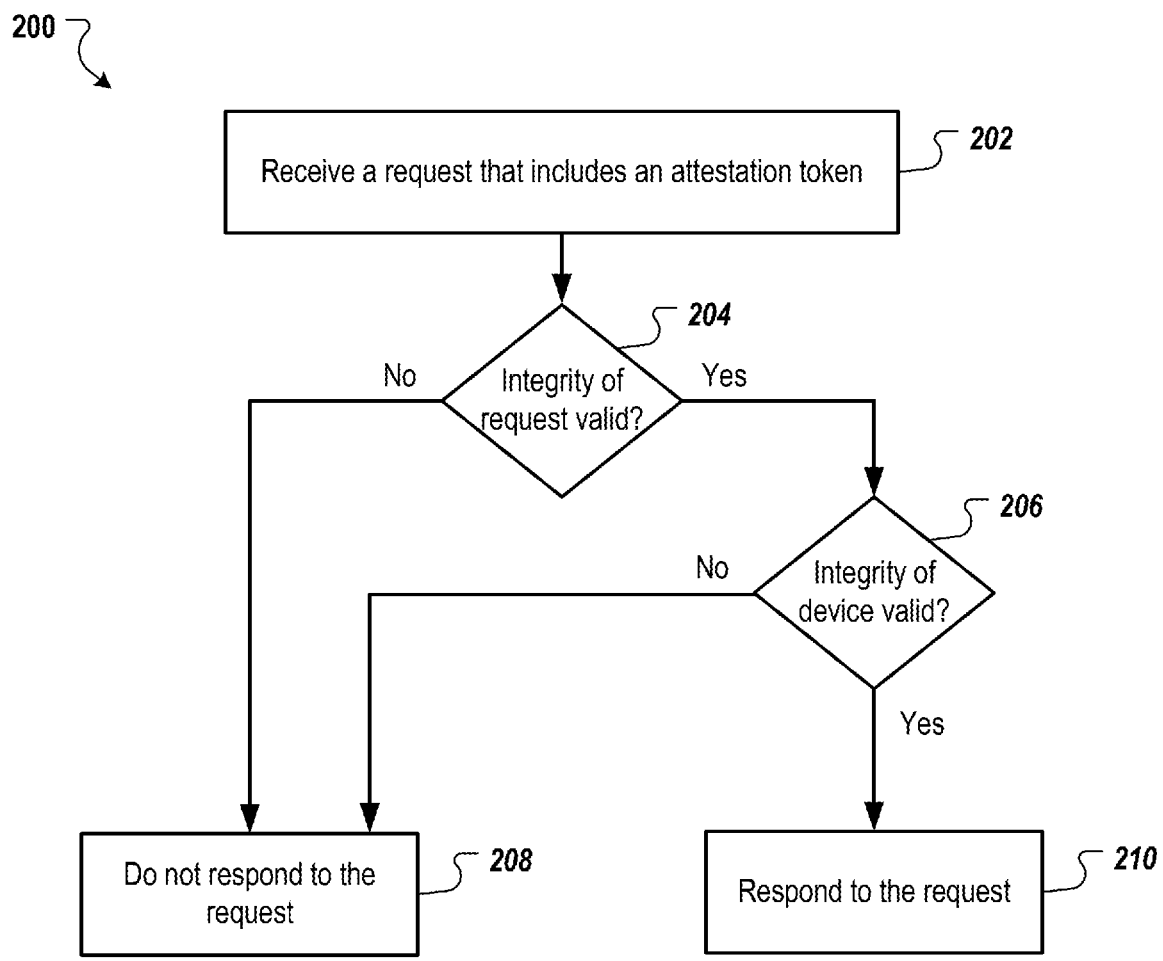
FIG. 2 is a flow diagram that illustrates an example process for validating the integrity of a request and the client device that sent the request and responding to the request.
Figure 3:
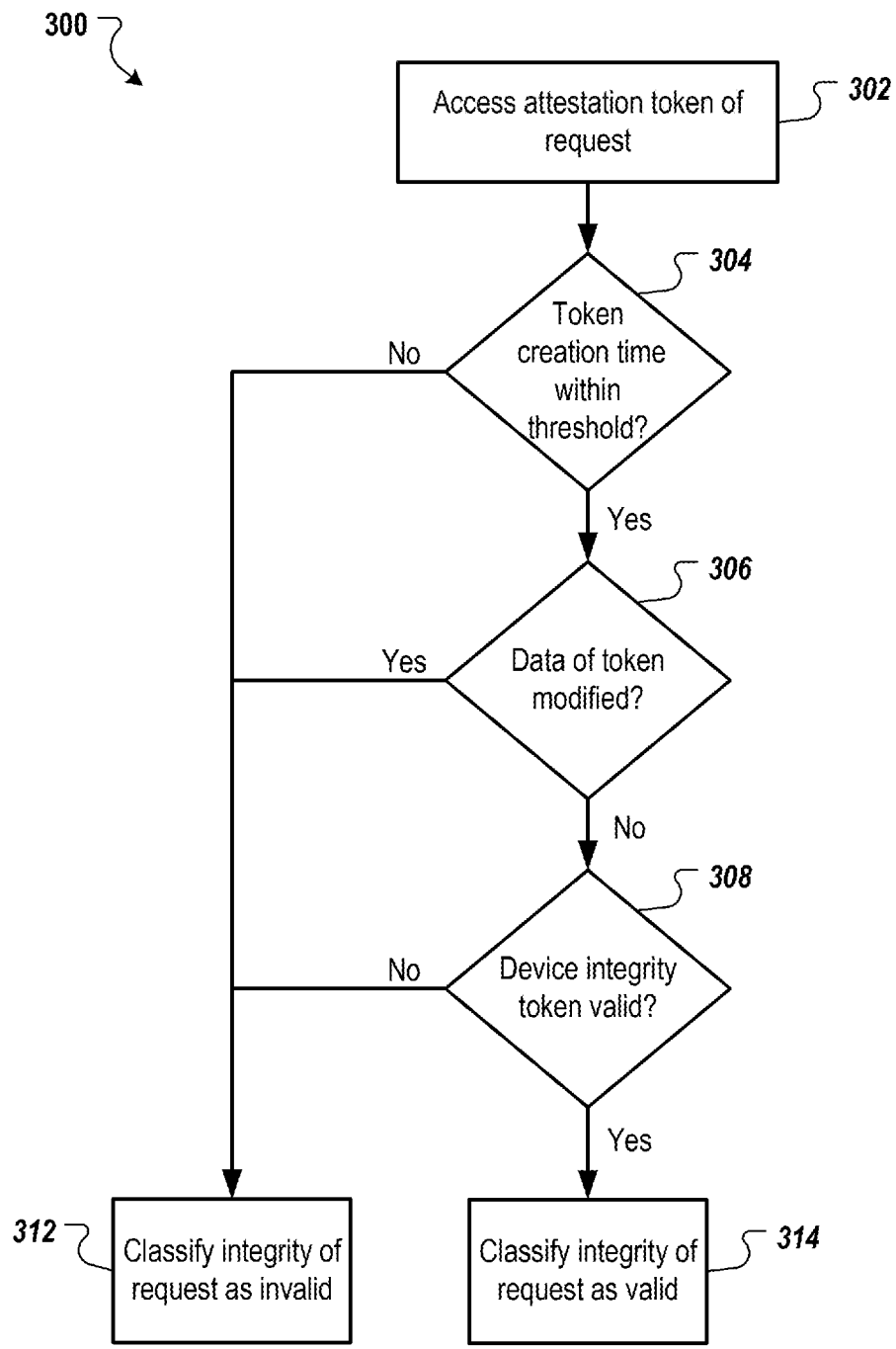
FIG. 3 is a flow diagram that illustrates an example process for determining whether the integrity of a request and client device that sent the request is valid using an attestation token.

When a recipient receives a request 120 (or other data communication) that includes an attestation token 122, the recipient can use the attestation token 122 to validate the integrity of the request 120 and the integrity of the client device 110 that sent the request 120 or other data communication, as described in FIGS. 2 and 3.

FIG. 2 is a flow diagram that illustrates an example process 200 for validating the integrity of a request and the client device that sent the request and responding to the request. The process 200 can be implemented, for example, by a recipient of the request, such as a publisher 130, a digital component distribution system 150, a digital component partner 170, or a digital component provider 160 of FIG. 1. Operations of the process 200 can also be implemented as instructions stored on non-transitory computer readable media, and execution of the instructions by one or more data processing apparatus can cause the one or more data processing apparatus to perform the operations of the process 200.

A request that includes an attestation token is received (202). An application of a client device can send a request in response to a user interaction with the application. For example, if the user navigates to a website to view a resource, a web browser application can send a request to the website. In another example, if a resource or application content includes a digital component slot, the application can send, to a digital component distribution system, a request for a digital component. In yet another example, if the user changes settings for storing the user's data, e.g., the storage of the user's data that has been captured in cookies and sent to another entity, the request can be a request to modify (e.g., delete) the user's data.

As described above, the request can include an attestation token that includes a set of data and a digital signature of the set of data. The set of data can include a public key of the client device that sent the request, a token creation time that indicates the time at which the attestation token was created, a payload, and/or device integrity token. The application can generate the digital signature of the set of data using the client device's public key.

A determination is made whether the integrity of the request is valid (204). The integrity of the request can be invalid if any data in the set of data changed between the time at which the attestation token was created or a duration of time between the token creation time and the time at which the request was received exceeds a threshold. In other words, the integrity of the request can be determined to be invalid if the determined token creation time exceeds a threshold duration of a time at which the request was received.

If a determination is made that the integrity of the request is invalid, a response to the request is not provided (206). That is, the recipient can ignore the request. For example, if the request is for a resource, the website may not provide the resource. If the request is for a digital component, the recipient that determines that the request is invalid may not provide a digital component. If the request is to delete or change user data, the recipient may not delete or change the user data in response to the request if the integrity of the request is invalid.

If a determination is made that the integrity of the request is valid, a determination is made whether the integrity of the client device that sent the request is valid (206). This determination can be made based on the device integrity token. As described above, the device integrity token can include a set of data that includes the public key of the client device that sent the request, a token creation time that indicates when the device integrity token was created, a verdict that indicates a level of trustworthiness of the client device that sent the request. The device integrity token can also include a digital signature generated using a private key of a device integrity system and the set of data of the device integrity token.

The determination of whether the integrity of the client device is valid can be based on whether data of the device integrity token was changed after the device integrity token was generated, the verdict of the device integrity token, and/or whether a duration of time between the token creation time and the time at which the request was received exceeds a threshold. For example, if the verdict indicates that the client device is not trustworthy, the recipient can determine that the integrity of the client device is invalid. An example process for determining whether the integrity of a request is valid and whether the integrity of a client device is valid is illustrated in FIG. 3 and described below.

If a determination is made that the integrity of the request is invalid, a response to the request is not provided (206). If a determination is made that both the integrity of the request is valid and the integrity of the client device is valid, a response is provided to the request (208). For example, if the request is for a resource, the website may provide the resource in response to the request. If the request is for a digital component, the recipient that determines that the request is valid may provide a digital component in response to the request. If the request is to delete or change user data, the recipient may delete or change the user data in response to the request if the integrity of the request is valid.

FIG. 3 is a flow diagram that illustrates an example process 300 for determining whether the integrity of a request is valid using an attestation token. The process 300 can be implemented, for example, by a recipient of the request, such as a publisher 130, a digital component distribution system 150, a digital component partner 170, or a digital component provider 160 of FIG. 1. Operations of the process 300 can also be implemented as instructions stored on non-transitory computer readable media, and execution of the instructions by one or more data processing apparatus can cause the one or more data processing apparatus to perform the operations of the process 300.

An attestation token is accessed (302). The attestation token can be included with a request received from a client device, e.g., from an application operating on the client device. As described above, the attestation token includes a set of data and a digital signature of the set of data. The set of data can include a public key of the client device that sent the request, a token creation time that indicates the time at which the attestation token was created by the client device, a payload, and/or a device integrity token.

A determination is made whether the token creation time is within a threshold time duration of a time at which the request was received or within a threshold time duration of a current time (304). For example, a determination can be made of the difference between the time at which the request was received (or the current time) and the token creation time. If the difference is less than or equal to the threshold time duration, the token creation time is within the threshold time duration. If the token creation time is not within the threshold time duration, e.g., meaning that the request is old, the integrity of the request can be classified at invalid (312).

If the token creation time is within the threshold time duration, e.g., meaning that the request is new or recent, a determination is made whether data in the set of data of the attestation token has been modified after the digital signature of the attestation token was generated (306). For example, the public key of the browser that is included in the attestation token can be used to verify the digital signature of the set of data. If the digital signature is verified, then the data was not modified after the digital signature was generated. If the verdict is that the set of data was not modified after the attestation token was created then it may be that the request is trustworthy. If the digital signature is not verified, then a determination is made that at least a portion of the data was modified. If the verdict is that the set of data was modified after the attestation token was created then it may be determined that the request is not trustworthy. Data in the set of data may have been modified if, for example, a fraudulent party had changed the content of a request, or if a request was incorrectly or falsely transmitted.

If a determination is made that the data in the set of data has been modified, the integrity of the request is classified as being invalid (312). If a determination is made that the data in the set of data of the attestation token has not been modified, a determination is made whether the device integrity token is valid (308). This determination can be based on the verdict of the device integrity token, whether the digital signature of the device integrity token can be verified using the public key of the device integrity system, and/or the token creation time that indicates the time at which the device integrity token was created.

The recipient can compare the verdict of the device integrity token to a threshold level of trustworthiness for that recipient. For example, the verdict can specify one of multiple levels of trustworthiness based on an evaluation of fraud signals received from the client device. In a particular example, there may be two levels, trustworthy or untrustworthy. In this example, if the verdict indicates that the client device is untrustworthy, the recipient can determine that the integrity of the client device is invalid and, therefore, that the integrity of the request is invalid 312.

In another example, there can be more than two levels of trustworthiness. In this example, the recipient's device can compare the level of trustworthiness specified by the verdict to a minimum level of trustworthiness specified by the recipient. If the verdict's level of trustworthiness satisfies the minimum level, the client device is deemed trustworthy for that recipient. For example, the range can be 0-5 with zero being completely untrustworthy and five being completely trustworthy. The recipient may consider levels of three or more valid devices for which the recipient will respond. In this example, if the verdict specifies a level of two or less, the recipient's device will determine that the integrity of the client device is invalid, and therefore, that the integrity of the request is invalid.

The public key of the device integrity system and the data in the device integrity token can also be used in an attempt to verify the digital signature of the device integrity token. If the digital signature is not verified, then data of the device integrity token has been changed and the device integrity token is invalid. In this case, the integrity of the request is classified as invalid (312). If the digital signature is verified, the data of the device integrity has not been changed since the device integrity token was created.

A determination can also be made whether the token creation time that indicates the time at which the device integrity token was received is within a threshold time duration of a time at which the request was received or within a threshold time duration of a current time. For example, a determination can be made of the difference between the time at which the request was received (or the current time) and the token creation time for the device integrity token. If the difference is less than or equal to the threshold time duration, the token creation time is within the threshold time duration. If the token creation time is not within the threshold time duration, e.g., meaning that the device integrity token is old, the device integrity token can be considered invalid and therefore, the request is classified as invalid (312).

If the verdict indicates that the client device is trustworthy or the level of trustworthiness specified by the verdict satisfies the threshold, the digital signature is verified, and the token creation time for the device integrity system is within its threshold time duration, the device integrity token can be considered valid. If the device integrity token is valid, the token creation time of the attestation token is within its threshold time duration, and the digital signature of the attestation token is verified, the integrity of the request is classified as valid.

In some implementations, a determination may be made whether the public key of the attestation token matches the public key of the device integrity token. These should both be the public key of the client device. If they match, and the other criteria (e.g., verdict is trustworthy, signature verified, etc.) is satisfied, the request can be considered valid. However, if the two public keys do not match, the request can be considered invalid. In some implementations, this check may not occur as one of the public key may be removed from one of the tokens prior to transmission from the client device purely for the benefit of smaller transmission size, without sacrificing the crypto power to detect fraud or falsified requests.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implement method comprising:
   receiving, from a client device, a request including an attestation token generated by the client device, the attestation token including:
   a set of data that includes at least (i) a public key of the client device, (ii) a token creation time that indicates a time at which the attestation token was created, (iii) a device integrity token issued to the client device by a device integrity system, and (iv) a payload that includes data specific to the request, wherein the device integrity token includes a verdict that indicates a level of trustworthiness of the client device that generated the attestation token, and wherein the level of trustworthiness is determined by the device integrity system based on fraud detection signals received from the client device; and
   a digital signature of the set of data, wherein the digital signature was generated using a private key that corresponds to the public key;
   verifying an integrity of the request using the attestation token, including:
   determining whether the token creation time is within a threshold duration of a time at which the request was received;
   determining, using the public key and the digital signature of the set of data generated using the private key, whether the set of data was modified after the attestation token was created;
   determining whether the verdict of the device integrity token indicates that the client device is a trustworthy client device; and determining that the integrity of the request is valid based at least on a determination that the token creation time is within the threshold duration of the time at which the request was received, a determination that the set of data has not been modified since the attestation token was created, and a determination that the verdict indicates that the client device is a trustworthy client device; and if the determination is that the request is valid, responding to the request in response to determining that the integrity of the request is valid.

2. The method of claim 1, wherein the request comprises a request to delete user data and the payload comprises data specifying an operation to delete the user data.

3. The method of claim 1, comprising, if the determination is not that the request is valid, ignoring the request.

4. The method of claim 1, wherein:
the device integrity token comprises a digital signature of a second set of data included in the device integrity token;
the digital signature of the second set of data is generated using a second private key of the device integrity system; and
determining that the integrity of the request is valid further comprises determining that the second set of data was not changed since the device integrity token was generated using a second public key that corresponds to the second private key to verify the digital signature of the second set of data.

5. The method of claim 4, wherein:
the second set of data comprises the public key generated by the client device; and
determining that the integrity of the request is valid further comprises determining that the public key in the set of data of the attestation token matches the public key in the second set of data of the device integrity token.

6. The method of claim 4, wherein:
the second set of data comprises a second token creation time that indicates a time at which the device integrity token was created; and
determining that the integrity of the request is valid further comprises determining that the second token creation time is within a second threshold duration of a time at which the request was received.

7. The method of claim 1, wherein the verdict indicates, out of more than two levels of trustworthiness, the level of trustworthiness of the client device.

8. The method of claim 1, wherein the device integrity token comprises a hash of the public key.

9. A system, comprising:
one or more processors; and
one or more memories having stored thereon computer readable instructions that, when executed by the one or more processors, cause the one or more processors to perform operations comprising:
receiving, from a client device, a request including an attestation token generated by the client device, the attestation token including:
a set of data that includes at least (i) a public key of the client device, (ii) a token creation time that indicates a time at which the attestation token was created, (iii) a device integrity token issued to the client device by a device integrity system, and (iv) a payload that includes data specific to the request, wherein the device integrity token includes a verdict that indicates a level of trustworthiness of the client device that generated the attestation token, and wherein the level of trustworthiness is determined by the device integrity system based on fraud detection signals received from the client device;
a digital signature of the set of data, wherein the digital signature was generated using a private key that corresponds to the public key;
verifying an integrity of the request using the attestation token, including:
determining whether the token creation time is within a threshold duration of a time at which the request was received;
determining, using the public key and the digital signature of the set of data generated using the private key, whether the set of data was modified after the attestation token was created;
determining whether the verdict of the device integrity token indicates that the client device is a trustworthy client device; and
determining that the integrity of the request is valid based at least on a determination that the token creation time is within the threshold duration of the time at which the request was received, a determination that the set of data has not been modified since the attestation token was created, and a determination that the verdict indicates that the client device is a trustworthy client device; and
if the determination is that the request is valid, responding to the request in response to determining that the integrity of the request is valid.

10. The system of claim 9, wherein the request comprises a request to delete user data and the payload comprises data specifying an operation to delete the user data.

11. The system of claim 9, wherein the operations comprise, if the determination is not that the request is valid, ignoring the request.

12. The system of claim 9, wherein:
the device integrity token comprises a digital signature of a second set of data included in the device integrity token;
the digital signature of the second set of data is generated using a second private key of the device integrity system; and
determining that the integrity of the request is valid further comprises determining that the second set of data was not changed since the device integrity token was generated using a second public key that corresponds to the second private key to verify the digital signature of the second set of data.

13. The system of claim 12, wherein:
the second set of data comprises the public key generated by the client device; and
determining that the integrity of the request is valid further comprises determining that the public key in the set of data of the attestation token matches the public key in the second set of data of the device integrity token.

14. The system of claim 12, wherein:
the second set of data comprises a second token creation time that indicates a time at which the device integrity token was created; and
determining that the integrity of the request is valid further comprises determining that the second token creation time is within a second threshold duration of a time at which the request was received.

15. The system of claim 9, wherein the verdict indicates, out of more than two levels of trustworthiness, the level of trustworthiness of the client device.

16. The system of claim 9, wherein the device integrity token comprises a hash of the public key.

17. A non-transitory computer readable medium storing instructions that upon execution by one or more computers cause the one or more computers to perform operations comprising:

receiving, from a client device, a request including an attestation token generated by the client device, the attestation token including:

a set of data that includes at least (i) a public key of the client device, (ii) a token creation time that indicates a time at which the attestation token was created, (iii) a device integrity token issued to the client device by a device integrity system, and (iv) a payload that includes data specific to the request, wherein the device integrity token includes a verdict that indicates a level of trustworthiness of the client device that generated the attestation token, and wherein the level of trustworthiness is determined by the device integrity system based on fraud detection signals received from the client device; and a digital signature of the set of data, wherein the digital signature was generated using a private key that corresponds to the public key;

verifying an integrity of the request using the attestation token, including:

determining whether the token creation time is within a threshold duration of a time at which the request was received;

determining, using the public key and the digital signature of the set of data generated using the private key, whether the set of data was modified after the attestation token was created;

determining whether the verdict of the device integrity token indicates that the client device is a trustworthy client device; and determining that the integrity of the request is valid based at least on a determination that the token creation time is within the threshold duration of the time at which the request was received, a determination that the set of data has not been modified since the attestation token was created, and a determination that the verdict indicates that the client device is a trustworthy client device; and if the determination is that the request is valid, responding to the request in response to determining that the integrity of the request is valid.

18. The non-transitory computer readable medium of claim 17, wherein the request comprises a request to delete user data and the payload comprises data specifying an operation to delete the user data.

19. The non-transitory computer readable medium of claim 17, wherein the operations comprise, if the determination is not that the request is valid, ignoring the request.

* * * * *